July 30, 1940. E. D. TILLYER 2,209,587
OPHTHALMIC LENS
Original Filed Dec. 7, 1935
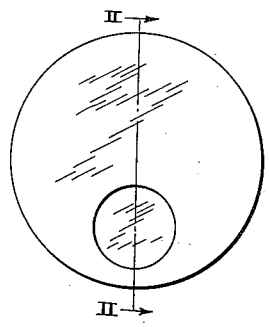
Fig. I
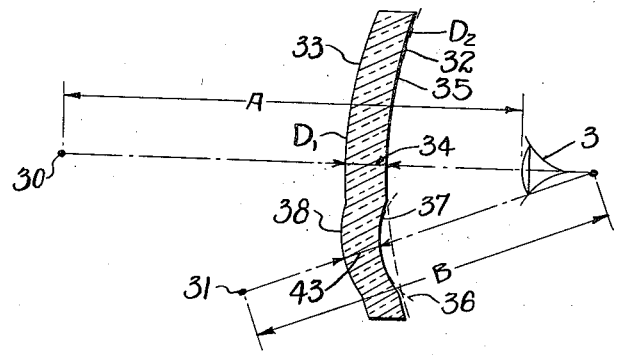
Fig. II
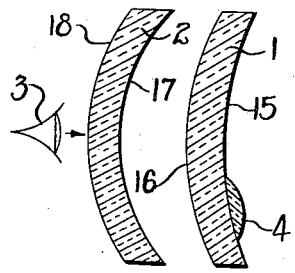
Fig. III
INVENTOR.
EDGAR D. TILLYER
BY Harry H. Still
ATTORNEY.

Patented July 30, 1940

2,209,587

UNITED STATES PATENT OFFICE 2,209,587

OPHTHALMIC LENS

Edgar D. Tillyer, Southbridge, Mass., assignor to American Optical Company, Southbridge, Mass., a voluntary association of Massachusetts Original application December 7, 1935, Serial No. 53,351. Divided and this application July 21, 1938, Serial No. 220,520

5 Claims. (Cl. 88—54)

This invention relates to improvements in bifocal or multifocal lenses and to an improved process of making the same and relates more particularly to bifocal or multifocal lenses used for the equalization of the mental impressions of size in the two eyes throughout the corresponding focal fields of the lenses without materially changing the required focal powers of said fields, said impressions being also referred to in the art as ocular images.

This application is a division of my copending application, Serial No. 53,351, filed December 7, 1935, which has matured into Patent No. 2,125,056 of July 26, 1938.

One of the principal objects of the invention is to provide improved means and method for forming lenses of the above character with fields of the same or different powers and/or magnifications.

Another object of the invention is to provide means of separating in a lens or lens systems of the above character, the size and focal power factors so that the said factors may be made the same or varied with respect to each other in the respective focal fields of the lens whereby the said lens may be made in a blank form, so one surface is left for the impression of the prescriptive focal power required in each respective focal field, the remaining parts giving the true size effect independently of the respective prescriptive surfaces.

Other objects are to provide lenses of this character having increased power for the reading distance and/or having different power and/or magnification for the reading portion from that of the distance portion, and/or having the reading portion of the same power as the distance portion but of different magnification, that is to say, lenses having a distance portion including means for change of size of image over the prescription requirements without change of focus thereof and another portion different from the first portion, and/or having a reading portion of different power than the distance power but of substantially the same magnification.

Another object of the invention is to provide a one piece type bifocal or multifocal lens having the above characteristics.

Another object of the invention is to provide an ophthalmic correction for the two eyes of a patient whereby the focal power factors of the respective lenses in each of the respective focal fields of said lenses are to the prescriptive requirements of the patient and also provide means for balancing the ocular image or mental impression size differences of the eyes in each of the respective fields of the lenses with substantially no change in the focal power factors of the respective focal fields of said lenses.

Other objects and advantages of the invention will become apparent from the following description taken in connection with the accompanying drawing. It will be apparent that many changes in the arrangement of parts, details of construction and steps of the process may be made without departing from the spirit of the invention as expressed in the accompanying claims. I, therefore, do not wish to be confined to the exact matter shown and described as the preferred forms have been shown by way of illustration only.

Referring to the drawing:

Fig. I is a front view of a lens embodying the invention;

Fig. II is a cross sectional view taken on line II—II of Fig. I.

Fig. III is a diagrammatic view in cross section showing the relation of a lens of two parts to the eye.

In the past, eye corrections embraced the corrections for sphere, cylinder and prism, either separately, in various combinations or embodying all of said corrections. Recently, a fourth correction has been added to these, namely, a correction for the difference in size of image of the two eyes or in different meridians of an eye without a change of the focus of the prescription requirements of the eye or eyes. The inclusion of this fourth element has introduced difficulties into the art of lens making not hitherto encountered; either additional lens surfaces are required or a modification of the various spherical, cylindrical or toric curves now in use may be required.

The new problem introduces practically a new art in eye examination and in the art of making lenses. These difficulties are increased where it is attempted to provide the new form of lens with fields for both distance and reading corrections, as it has been found by past experience and by actual test that the eyes of a patient may have a different ratio of size error when looking at a near object than when looking at a distant object and that this size difference may be entirely different from that introduced by the change of power in the near vision portion of the lens. This, therefore, necessitates the provision of lenses having two or more different focal fields for different object distances wherein the power factors and the magnification factors of the different respective focal fields may be altered independently of each other and without the altering of one factor bringing about a change in the other factor in the finished lenses. It is, therefore, one of the principal objects of this invention to provide lenses of the above character with different focal fields and to provide a practicable and economical process for making the same whereby all of the desired characteristics of the lenses may be incorporated in an ophthalmic correction embodying one or more lens elements in the lens system or systems producing the final prescriptive requirements.

Referring to the drawing wherein like characters of reference indicate like parts throughout:

In Fig. III, I have shown an elementary lens of two parts designed to change the size of image of the focal prescription requirements without change of power thereof. The eye is shown at 3. The element 1 is the ordinary prescription lens having the surfaces 15 and 16 designed in the usual prior art way for corrections of sphere, cylinder and prism, one, all or any. The element 2 is the element that provides the change in size of image from the focal prescription requirement with practically no change of power thereof. It has the surfaces 17 and 18 arranged as follows: The relationship of the surfaces 17 and 18 is such as to provide substantially no optical power but a magnification. These surfaces may be flat, spherical, toric or cylindrical. The amount of change in size depends upon the curvatures of the two surfaces and the thickness of the element. Where change in size of the two major meridians is desired, the spherical surfaces are used; when change in one meridian is desired only, the cylindrical surfaces are used. In such a lens element the two surfaces in order to produce no optical power are nearly concentric. When the concave side of the element is placed nearest the eye, the size of the image is increased; when the convex side of the element is nearest the eye, the size of the image is decreased; the former is preferred. The desired change in size is obtained by the optical relationship or shape of the two surfaces of the element and the thickness thereof. The magnification in a no power optical element is due to the bending or curving of the element. If a distant object is viewed through a plane parallel, the effect of this plane parallel is negligible.

If, however, we bend this plane parallel as happens when it is ground on different base curves, a magnification will be produced. The element 2 is shown curved or bent to give the desired amount of magnification.

For description of lenses of this nature, see article entitled "Lenses for changing the size and shape of dioptric images" by Ames, Gliddon and Ogle of the Department of Research in Physiological Optics, Dartmouth Medical School, Hanover, New Hampshire, contained in a pamphlet reprint from the Annals of the Distinguished Service Foundation of Optometry, Boston, Massachusetts, 1932, page 27.

The method of constructing a "size" lens, having focal power and in addition thereto, a size magnification independent of the magnification due to power, is old in the art, being set forth in United States Letters Patent No. 1,933,578 to Ames, November 7, 1933.

The method of obtaining the thickness, surfaces, separations and lens characteristics are set forth in this patent with the necessary formula and examples, etc. The lens of the said Ames patent, is the lens of the publication referred to above. The lens produced gives the required axial focal power and the required "size" magnification. As explained in the said patent, the characteristics are, the distance from the eye, the distance to the object, the thickness and separations and the curvatures of the surfaces. The "size" element is a function of the form or shape of the lens and the thickness, the power element is the relationship of the surfaces, one to the other, as usual in prior art lenses.

The first step in the invention is to calculate the basic "size" and power lens for a given distance of object as described in said publication and patent. This is usually the major or reading field of the lens of the invention.

For the purpose of providing an additional field a second focal field 4 for the reading distance is placed on the lens, the other portion of the lens being arranged for distance vision.

The arrangement of the two fields will be dependent on the optical requirements for each field.

The procedure is to first calculate the major field to required power and "size" magnification to the required distance of object and then to calculate the minor field to required focal power and "size" magnification to required distance of object and then produce the major lens and impose the minor one thereon. Both fields are calculated by prior art methods as stated, and the surfaces are made and the lens constructed by well known prior art methods of grinding and polishing. The surfaces are of types well known in the art.

The invention is new and novel in the calculated relationship of the lens elements to produce size magnifications at different distances and in the result obtained. The process comprises a new series of steps to so relate the parts for the desired results. As set forth in the said Ames patent in the formula therein, one of the elements of a "size" lens is the distance of the object from the eye. The major lens is primarily for distant vision, i. e., for sight of a relatively distant object. The minor lens is primarily for reading distance or distances nearer than the object of the major field, hence the distances being different for the two fields the "size" magnification for the two fields may also be different and their ratios different.

In considering the focal powers of the two fields as well as the "size" magnifications therefor, it is to be understood that as usual in prior art lens considerations, zero power is the transition point from plus to minus powers, and zero magnification is the transition point from plus to minus magnifications. Zero, therefore, is considered a power or magnification as the case may be, to provide the transition between plus and minus powers and magnifications.

While the above lens has been described as being formed of two separate elements the lens embodying the invention, as shown in Figs. I and II, is formed of a single piece of lens medium having the reading field formed integrally therewith.

As previously stated, it has been found by actual tests that an eye has a different magnification or image when looking at a near object or object at substantially reading distance from the eye than when looking at a distant object or object twenty feet or more from the eye, so that when forming a bifocal or multifocal lens this difference of image size for said distances must be considered as well as the focal power for said distances. It has been found that the focal power differences between the said fields may be greater or less than the size image differences and that each factor must, therefore, be considered and dealt with separately in the computation of the lens.

So far we have spoken of magnification and size magnification in the general known procedures. For the actual discussion of Figures I and II it is advantageous to use the concepts of my issued Patent No. 2,077,134. This concept briefly is that magnification due to the focal power of the lens system can be separated from the magnification due to the shape, thicknesses, etc., of the lens system; the first of these we call power magnification and the latter shape magnification.

The lens of Fig. II is of the one piece type having a correction for a distant object 30 at a large distance A from the eye and an object 31 at a distance indicated at B substantially equal to the reading distance, usually four hundred millimeters from the eye. This particular lens is formed from a crown glass having an index of refraction of 1.523, which is in common use in forming present day ophthalmic lenses, and has all of its surface curvatures controlling the power and/or size correction in the different focal fields thereof, formed on a single piece of lens medium.

To illustrate how a lens of this nature may be formed with all the prescriptive requirements as to focus and magnification, let us first assume that the finished lens is to have a power of plus 1.00 diopters and a shape magnification of 2 per cent in the distance portion thereof and a plus 2.00 diopter addition or 3.00 diopter power and a shape magnification of 4 per cent in the reading field.

In the following computations:
$D_1$ is the front surface of the lens.
$D_2$ is the rear surface of the lens.
$D_e$ is power as measured from the ocular surface, assuming parallel light entering the system.
$s$ is the reduced thickness of each element.
$\tau$ is the actual thickness of each element.
$\Sigma \tau$ is the total lens thickness.
$\eta$ or $\mu$ is the glass index, $$s = -t = \frac{\tau}{\mu}$$

M' is the total magnification or size magnification of a distant object.
S' is the distance shape magnification.
P' is the distance power magnification.
U is the distance from the effective stop point to the ocular surface of the lens system.
$d'$ is the distance from the ocular surface to the object.
M is the total magnification of a near object.
S is the near shape magnification.
P is the near power magnification.
$\rho_1, \rho_2$, etc., are the surface powers of successive surfaces following the sign conventions of Pendlebury as given in 'Charles Pendlebury, M. A. F. R. A. S. published Cambridge, England, 1884.'
$t_1, t_2$, etc., are the successive thicknesses or separations divided by the index of refraction of the medium, either glass or air, and taken in the negative senses as Pendlebury uses those values.

The terms A, B, C and D are the gauss equations as given by Pendlebury, designating certain function of surfaces, indices, thickness and special relations in a lens system. Specifically A is the reciprocal of the equivalent focal length of the system, B is the partial derivative of A with respect to the first surface power, C is the partial derivative of A with respect to the last surface power and D is the second partial derivative with respect to the first and last surface power.

$l$ is the distance for the entrance window or reference point of the eye to the object and is equal to $U + d'$.

The formulae which will be used in computing the reduced thickness from the fictitious ocular surface $(D_2)$ and a given value of $S'-1$ or the percentage of $S'$ is given implicitly in my copending application but for clarity the derivation of this form is here given. Using the notation of the copending application, for a single thick lens $$D_e = \frac{\rho_1 + \rho_2 + \rho_1 \rho_2 t_1}{1 + \rho_1 t_1}$$

and $$S' = \frac{1}{C} = \frac{1}{1 + \rho_1 t}$$

then $$S' - 1 = \frac{-\rho_1 t_1}{1 + \rho_1 t_1}$$

Then if we make $\rho_2$ such a value that $D_e$ is zero we have $\rho_1 + \rho_2 + \rho_1 \rho_2 t_1 = 0$ or $$-\frac{\rho_1 t_1}{1 + \rho_1 t_1} = \rho_2 t_1 = (S' - 1)$$

Therefore, $S' - 1 = \rho_2 t_1 = -s (D_2)$ where $(D_2)$ is the fictitious ocular surface.

The derivation of the equations in the above paragraph are given in applicant's issued Patent No. 2,077,134.

The method of computing the lens is as follows:
I first assume a fictitious zero power lens ocular surface 32, of say minus 6 diopters, which surface will be generally known in the formula as the fictitious rear surface $(D_2)$ of the lens. The minus 6 diopter curve is chosen because, for a weak distance correction, it enables the production of a good form of lens. With the known required values for the distance portion of the lens, the surface curvatures, thickness, etc. of the lens are applied as follows:

$$(S'-1) = 2\% = 0.02 = -s(D_2)$$
$$-s(-6) = 0.02 \quad s = 0.00333$$

thickness of lens $= s \times \text{index} = 0.00508$ m. $= 5.08$ mm.

The front surface 33 to give zero power will therefore be plus 5.88 diopters. To obtain the desired power of plus 1.00 diopter in the distance portion, I add this value to the fictitious minus 6 surface and obtain an actual minus 5 diopter surface. The distance lens form will now be; on the front surface 33 a curvature of about plus 5.88 diopters, a thickness 34 of about 5.08 millimeters, and an ocular surface curvature 35 of about minus 5.00 diopters. Note.—Actually this lens would be a little better for oblique aberrations if the computation were gone through again and about a minus 6.50 diopters or minus 6.75 diopters fictitious surface were assumed.

Now let us assume a plus 2 diopter addition for segment field with a 4 per cent S magnification, that is, $S-1 = 0.04$. This 2 diopter addition gives for the total reading power, plus 3 diopters. The segment diameter is to be 20 millimeters.

The exact glass thickness 43 depends upon the position and diameter of the segment and for each specific case must be determined by the usual methods of determining lens thicknesses. However, for fairly close approximation, to start with, we can assume certain obvious things.

First of all, the segment has two diopters more power than the distance so it will be thicker than the distance portion where the segment is placed. This increase in thickness is 0.2 millimeter but the segment is below the center of the distance portion where the lens is thinner; now a fair position is for the upper edge to be 5 millimeters below the optical center of the distance portion, or the optical center of the distance portion to be 15 millimeters from the center of the segment causing the center of the segment to be 0.2 millimeters thinner than the center of the distance portion so our new thickness 43 at center of the segment will be 5.1 mm.+0.2 mm.−0.2 mm.=5.1 mm.=0.051 m.

The next thing to obtain is a fictitious curvature 36 by which the power and magnification of the reading field can be worked out. We require that $(s-1)=4\%=0.04=-s(D_2)$ and $$s=\frac{0.0051}{1.523}=0.00333$$

so $$-(D_2)=\frac{0.04}{0.00333}=-12 \text{ diopters}$$

for the fictitious ocular surface 36. Now we desire a total power of plus 3 diopters, therefore the actual ocular surface 37 of the segment is −12+3=−9 diopters and the front curve 38 of the segment is then put on, which if we actually had the fictitious surface −12 diopters on the lens, would give zero power. This surface will be about plus 11.54 diopters. These figures for the correction of power due to thickness and the depth of curve or thickness change for different powers have been taken from practical lens grinder's charts and are simply approximate and are given herein only by way of illustration.

Let us take the same example as the preceding and assume no shape magnification S for the segment. This is obtained by making the front 38 flat where the segment is and putting all the power on the ocular surface 37, that is, for the segment a plus 3.00 diopter curve instead of the minus 5.00 diopter curve of the distance power.

It will be seen that any values within practical limits as regards power and shape magnification may be obtained by the method shown.

I have shown examples of the computation of the reading portion of a bifocal in terms of the distance shape magnification as being the practical way to compute this lens. If the distance shape magnification is not known in terms of the near shape magnification which may be given on the prescription, it can be determined by the method which follows:

The shape magnification for a distant system S' can be expressed in terms of the near shape magnification S and the known lens constants by a simple formulae. In my issued Patent No. 2,077,134, I have shown that the total magnification of a system is $$M=\frac{U+\Sigma\tau+d}{U(B-Ad)+Cd-D}=\frac{l}{U(B-Ad)+Cd-D}$$

Then, if we consider the power of the system as in one lens surface at the position of the ocular surface and call this value $$D_e=\frac{A}{C}$$

all the other surfaces vanishing, then $A=\rho1$; $C=1$; $B=1$; $D=0$, and $d$, the distance from the front of the system becoming $d'$ which is the new $d$; and since the object is at the same position in space $d'=d+\Sigma\tau$. At the same time, call this specialized value of M as P since it is the magnification due to power alone measured from the ocular surface. Substituting these values in the above equation we have for the power magnification for a near object $$P=\frac{l}{U(1-d'D_e)+d'}=\frac{1}{1-U\frac{d'}{l}\cdot D_e}$$

since $U+D'=l$

Then for any shape of system, define S so that $S \times P=M$, the total magnification therefore $$S=M\left(1-U\frac{d'}{l}-D_e\right)$$

We can arrive at the same formulae for P by putting an infinitely thin lens at the position of the ocular surface without using the general formulae but the demonstration is longer.

In my issued Patent No. 2,077,134, I previously have defined the distance shape magnification $$S'=\frac{1}{C}$$

and $$P'=\frac{1}{1-UD_e}$$

which of course, is easily derived from the near value of P since $$\frac{d'}{l}=\frac{d'}{d'+U}$$

and if $d'$ becomes very great the ratio of $$\frac{d'}{l}$$

is unity.

The ratio of the distance to the near shape magnification $$\frac{S'}{S}=\frac{1}{C.M\left(1-U\frac{d'}{l}-D_e\right)}$$

which after reduction becomes $$\frac{S'}{S}=1+\frac{U}{l}\frac{(S'^2-1)}{1-U\frac{d'}{l}\cdot D_e}-\frac{(\Sigma\tau+DS')(1-UD_e)}{l\left(1-U\frac{d'}{l}\cdot D_e\right)}$$

or $$\frac{S'}{S}=1+\frac{U}{l}(S'^2-1)\cdot P-\frac{\Sigma\tau+DS'}{l}\frac{P}{P'}$$

The first term involves all known quantities except $S'^2-1$ and for this the value of $S^2-1$ may be used as a first and generally final approximation. The distance from the effective stop point to the ocular surface is U. The distance from the ocular surface to the object is $d'$ and $l=U+d'$ and of course $D_e$ is the power as measured from the ocular surface assuming parallel light entering the system.

An approximate computation of the values of this term follows: The value of U may be about 20 millimeters or 0.020 meter. Value $d'$ is for ordinary reading distance, 400 millimeters=0.400 meter. This corresponds to the usual 2.50 diopter addition for reading.

We will take a total of plus 3 diopters for $D_e$.

Now, let us assume a value of S or S' as 1+3% or 1.03. Then the first term is:

$$\frac{0.020}{0.440}\left(\frac{(1.03^2-1)}{1-0.020\times\frac{(400)}{(420)}\times 3}\right)=\frac{1}{21}\left(\frac{0.06}{0.94}\right)=0.003$$

Therefore, this term adds 0.3% to S to obtain S'.

The next term involves the thickness of the glass of the whole system. Let us assume this is 5 millimeters; therefore $\tau=0.005$ m. The exact value of D may be obtained from my issued Patent No. 2,077,134. A value sufficiently close for this purpose is $$\frac{\tau}{\mu}=-0.0033$$

Therefore, we have, for the second term, $$\frac{\{0.0050-0.0033(1.03)\}\times(1-0.020\times 3)}{0.420\left\{1-0.020\left(\frac{0.400}{0.420}\right)\times 3\right\}}$$

= −0.004 approximately, or about −0.4%, as the second term in the reduction of $$\frac{S'}{S}$$

Therefore, we have for the value of $$\frac{S'}{S}$$

$$\frac{S'}{S}=1+0.003-0.004$$

or, in per cent we have S' differs from S by 0.1% for this example. Therefore, for this example, which is an average one, no reduction is needed for S or S' but when needed the values can be easily computed or tabulated.

In the designing of the lens an average thickness value which corresponds to a reading addition of about two diopters is selected so that if the required addition is from 1.50 to 2.50 diopters, the error introduced due to variation in thickness brought about by the use of these additions will be relatively small and negligible. This arrangement permits the provision of lens blanks by which a certain shape magnification for the major field and another shape magnification for the segment may be obtained for a plurality of lenses with varying power corrections in both the distances and reading portions of the lens, which power corrections will have no effect upon the shape magnification factor of said fields.

The latter matter of computing lenses relating to my issued Patent No. 2,077,134 provides a blank having its ocular side designed to receive a compound surface, which surface over the distance portion of the lens is such as to produce the required power through said distance portion and which surface over the reading area of the lens is such as to produce the desired power through the reading portion so that both the near and distance prescriptive powers may be obtained independent of the magnification factors of the fields. This is due to the fact that in both the distance and reading fields the shape magnification values are independent of the power magnification values of the respective focal fields of the lens.

From the foregoing description it will be seen that I have provided simple, efficient and economical means whereby a lens formed of a single piece of lens medium may be provided with any desired focal power and magnification correction whereby said focal power and magnification factors may be considered and controlled more or less separately and independently of each other.

Having described my invention, I claim:

1. A lens of the onepiece multifocal type comprising lens medium of a given index of refraction throughout, and having a distance vision portion and an adjacent near vision portion, said distance vision portion having opposed surfaces of different curvature providing a field for use in equalizing the size difference of images of the two eyes for a relatively long, given object distance, having a prescriptive shape magnification and prescriptive focal power for said relatively long, given object distance and said distance vision portion having a given position before the eye in the line of normal distance vision, said near vision portion having surfaces of different curvature providing a field for use in equalizing the size difference of images of the two eyes for a relatively short, given object distance, having a prescriptive shape magnification and prescriptive focal power for said relatively short, given object distance, and said near vision portion having a given position before the eye in the line of normal near vision and in predetermined positional relation with said distance vision portion, and each of said vision portions having a front optical surface and a given predetermined thickness, which, combined together for a lens medium of said index of refraction and given position before the eye will produce the prescriptive shape magnification component desired of each respective vision portion in which portions $$S'=\frac{1}{1-s_1 D_1}$$

wherein S' is the required shape magnification for each of the major meridians, $s_1$ is the thickness divided by the refractive index of the medium and $D_1$ is the front surface power of said meridian, and a rear or ocular surface on each respective vision portion being computed so that when combined with the respective front surfaces and the given index of refraction, while maintaining said given thicknesses, will produce the prescriptive focal component desired of each respective vision portion with substantially no change of the shape magnification thereof.

2. A lens of the onepiece multifocal type comprising lens medium of a given index of refraction throughout, and having a distance vision portion and an adjacent near vision portion, said distance vision portion having opposed surfaces of different curvature providing a field for use in equalizing the size difference of images of the two eyes for a relatively long, given object distance, having a prescriptive shape magnification and a prescriptive focal power for said relatively long, given object distance and said distance vision portion having a given position before the eye in the line of normal distance vision, said near vision portion having surfaces of different curvature providing a field for use in equalizing the size difference of images of the two eyes for a relatively short, given object distance, having a prescriptive shape magnification and prescriptive focal power for said relatively short, given object distance and said near vision portion having a given position before the eye in the line of normal near vision and in predetermined positional relation with said distance vision portion, and each of said vision portions having a front optical surface and a given predetermined thickness, which, combined together for a lens medium of said index of refraction and given position before the eye will produce the prescriptive shape magnification component desired of each respective vision portion in which portions $$S' = \frac{1}{1 - s_1 D_1}$$

wherein S' is the required shape magnification for each of the major meridians, $s_1$ is the thickness divided by the refractive index of the medium and $D_1$ is the front surface power of said meridian, and a rear or ocular surface on each respective vision portion being computed so that when combined with the respective front surfaces and the given index of refraction, while maintaining said given thicknesses, will produce the prescriptive focal component desired of each respective vision portion with substantially no change of the shape magnification thereof, said front optical surfaces and thicknesses of the respective vision fields providing the variable controlling elements for the shape magnification component of each field substantially independently of the power component thereof and the rear surfaces of the respective fields providing the variable controlling elements for the power component of each field substantially independently of the shape magnification component thereof.

3. A blank for a lens of the onepiece multifocal type which is to have a distance vision portion having a prescriptive shape magnification and a prescriptive focal power for use in equalizing the size difference of images of the two eyes for a given relatively long object distance, and an adjacent near vision portion having a prescriptive shape magnification and a prescriptive focal power for equalizing the size difference of images of the two eyes for a given relatively short object distance, said blank comprising a single piece of lens medium of a single given index of refraction throughout and having a portion for distance vision and a given position before the eye, with a front optical surface which for a given thickness when combined together for a lens medium of said index of refraction and given position will produce the prescriptive shape magnification desired for said distance vision portion, and a portion for near vision and a given position before the eye and adjacent said distance vision portion with a front optical surface which for a thickness which when combined together for a lens medium of said index of refraction and given position will produce the prescriptive shape magnification desired for said near vision portion in which portions $$S' = \frac{1}{1 - s_1 D_1}$$

wherein S' is the required shape magnification for each of the major meridians, $s_1$ is the thickness divided by the refractive index of the medium and $D_1$ is the front surface power of said meridian, said blank having an excess of material in the direction of the thickness on the ocular side of the lens medium, to provide for the placing on said ocular side of an optical surface over said distance vision portion of such power that when combined with the front surface, given thickness and index of refraction of said distance vision portion will produce the prescriptive focal power desired for said distance vision portion with substantially no change of the shape magnification factor thereof, and for the provision of an optical surface over said near vision portion of such power that when combined with the front surface, thickness and index of refraction of said near vision portion will produce the prescriptive focal power desired for said near vision portion with substantially no change of the shape magnification factor thereof.

4. The method of forming a lens of the one-piece bifocal type comprising lens medium of a single given index of refraction throughout, including the steps of providing a distance vision portion and a near vision portion in which portions $$S' = \frac{1}{1 - s_1 D_1}$$

wherein S' is the required shape magnification for each of the major meridians, $s_1$ is the thickness divided by the refractive index of the medium and $D_1$ is the front surface power of said meridian, by forming on a predetermined portion of the front side of a piece of lens medium of said index of refraction, a finished optical surface of a curvature which, in combination with a given thickness of said lens medium, will provide a desired shape magnification for said predetermined portion, forming on the adjacent remaining portion of said front side a finished optical surface of a curvature which, in combination with another given thickness of said lens medium will provide a different desired shape magnification for said adjacent remaining portion, forming, on a portion of the ocular side of said piece of lens medium related with one of said front surface portions, a finished optical surface and simultaneously reducing the thickness of said portion to the said given thickness for said portion so that when combined with the front surface curvature of said portion, it will produce the prescriptive focal power desired of said portion with substantially no change of the shape magnification previously achieved in said portion, and on the other portion on the ocular side related with the front surface of said other portion, forming a finished optical surface and simultaneously reducing the thickness of said other portion to the said given thickness for said other portion, so that when combined with the front surface curvature of said other portion it will produce the prescriptive focal power desired of said other portion with substantially no change of the shape magnification previously achieved in said other portion.

5. The method of forming a multifocal lens blank having prescriptive shape magnification controlling means and to which may be embodied focal power control means without altering said shape magnification as produced by said shape magnification controlling means, comprising forming on the front side of a single piece of lens medium of a given index of refraction and over a given portion thereof, a front optical surface of a curvature which combined with a given thickness for said portion will introduce the shape magnification value desired in one finished focal field of the lens and over the front side of another portion thereof a given curvature which combined with a given thickness consideration will introduce the magnification value desired in another focal field of the lens in which portions $$S' = \frac{1}{1 - s_1 D_1}$$

wherein S' is the required shape magnification for each of the major meridians, $s_1$ is the thickness divided by the refractive index of the medium and $D_1$ is the front surface power of said meridian, allowing, during the forming of said front surfaces, a thickness to remain in excess of said given thickness consideration for the respective focal fields of the lens, so as to provide a free surface on the ocular side of said blank in excess of said given thickness considerations, on which curve surfaces may be formed on the ocular side of said respective portions of the lens, which, in combination with said front surfaces, will introduce the prescriptive focal power desired in the respective focal fields of the finished lens without altering the prescriptive shape magnification values introduced in said respective focal fields by said previously formed front optical surfaces while maintaining said given thickness considerations for said respective focal fields.

EDGAR D. TILLYER.